United States Patent [19]

Auerbach

[11] Patent Number: 5,070,127

[45] Date of Patent: Dec. 3, 1991

[54] IMPACT MODIFIED POLYPHENYLENE SULFIDE

[75] Inventor: Andrew Auerbach, Livingston, N.J.

[73] Assignee: Hoechst Celanese Corporation, Somerville, N.J.

[21] Appl. No.: 615,859

[22] Filed: Nov. 20, 1990

Related U.S. Application Data

[63] Continuation-in-part of Ser. No. 376,525, Jul. 7, 1989.

[51] Int. Cl.$^5$ ................................................. C08K 5/54
[52] U.S. Cl. ................................... 524/262; 524/504; 524/505; 525/64; 525/69; 525/537
[58] Field of Search ................... 524/504, 282; 525/64, 525/69

[56] References Cited

U.S. PATENT DOCUMENTS

| | | | |
|---|---|---|---|
| 4,080,357 | 3/1978 | Gergen et al. | 525/95 |
| 4,429,076 | 1/1984 | Saito et al. | 525/94 |
| 4,436,865 | 3/1984 | Beaver | 525/92 |
| 4,581,411 | 4/1986 | Liang et al. | 525/189 |
| 4,628,072 | 12/1986 | Shiraki et al. | 525/95 |
| 4,906,687 | 3/1990 | Modic | 525/92 |

*Primary Examiner*—Melvyn I. Marquis
*Assistant Examiner*—David W. Woodward
*Attorney, Agent, or Firm*—Depaoli & O'Brien

[57] ABSTRACT

The present invention relates to an impact resistant polymeric composition comprising a polyarylene sulfide, a thermally stable modified selectively hydrogenated high 1,2 content block copolymer wherein at least one graftable functional molecule is grafted to the block copolymer in the vinylarene block and a silane.

26 Claims, No Drawings

IMPACT MODIFIED POLYPHENYLENE SULFIDE

BACKGROUND OF THE INVENTION

This is a continuation-in-part application of U.S. Ser. No. 376,525, filed July 7, 1989.

This invention relates to polyarylene sulfide resin compositions having improved impact strength.

Polyarylene sulfide resins are attracting attention as high-performance engineering plastics having higher heat resistance, chemical resistance and rigidity than usual engineering plastics such as polycarbonate, polyacetal, nylon and polybutylene terephthalate. It is known that inclusion of a fibrous reinforcing material such as glass fibers into polyarylene sulfide leads to a striking improvement in the properties necessary for use as engineering plastics, such as strength, rigidity, toughness, heat resistance and dimensional stability. It is also known that with a glass fiber-reinforced polyarylene sulfide resin composition, the strength and rigidity increases generally with increasing amount of the glass fibers incorporated therein. Accordingly, when increased strength and rigidity are desired, it is the general practice to increase the amount of the glass fibers incorporated into the resin composition.

A relatively recent development has been the use of polyarylene sulfide compositions such as, for example, polyphenylene sulfide compositions, for molding electronic components and as encapsulating materials for electronic components. These compositions typically comprise glass fiber-reinforced polyarylene sulfide. Electronic components are molded or otherwise encapsulated to maintain electrical insulation, to provide mechanical protection and to otherwise shield the metallic components from exposure to the environment. As the evolution of electronics continues its rapid advance, it becomes increasingly important that the art and technology of molding and encapsulation keep pace.

Polyphenylene sulfide is useful in electronic applications such as in the formation of circuit boards, connectors and the like since polyphenylene sulfide can withstand the temperatures of vapor phase soldering which temperatures often are above 220° without adversely effecting the properties of the molded resin such as blistering or dimensional distortion. Unfortunately, although polyphenylene sulfide has the necessary thermal stability for electronic applications, the material is relatively brittle and, thus, has low impact strength. Moveover, it is desirable to increase the glass fiber loading of the polyphenylene sulfide for both cost reasons and for enhancing the strength and heat stability of the molded resin. Increasing the glass fiber content has an additional embrittling effect.

It is known to improve the impact strength of polyarylene sulfide by the addition of elastomeric materials thereto. Thus, U.S. Pat. No. 4,581,411 discloses improving the impact strength of polyarylene sulfide and glass-reinforced polyarylene sulfide by adding from about 0.1 to about 40 wt.% of a polymeric rubber which is selected from among silicon rubber, ethyleneacrylic rubber, ethylene-propylene rubber, ethylene-propylenediene rubber, and poly(butylacrylate) rubber. It is also disclosed that further enhancement of the impact strength of the composition can be achieved when using either the silicon rubber or the poly(butylacrylate) rubber by adding small amounts of an organosilane.

U.S. Pat. No. 4,476,284 discloses polyarylene sulfide compositions which have improved physical properties including impact resistance by the inclusion therein of a thermoplastic elastomeric hydrogenated conjugated diene/monovinyl arene block polymer. The preferred hydrogenated conjugated diene/monovinyl aromatic block copolymers are isoprene/styrene or butadiene/styrene block copolymers. While the patent discloses that the desirable effects of the invention are found in the presence of any amount up to and over about 30% of the hydrogenated block copolymer, the preferred range is disclosed as from about 1–5% by weight.

U.S. Pat. No. 4,451,607 discloses increasing the crystallinity of polyarylene sulfide by blending therewith hydrogenated conjugated diene/monovinyl aromatic block copolymer in an amount up to about 5% by weight.

U.S. Pat. No. 4,628,072 discloses improving the impact strength of thermoplastic polymers, including polyarylene sulfide, by addition thereto of partially hydrogenated block copolymers of a monovinyl substituted aromatic hydrocarbon polymer and an olefin polymer block. The block copolymer has grafted thereto a unit containing a carboxylic acid group. As described in U.S. Pat. No. 4,783,503, the graft of the carboxylic acid group is attached by a process called "ENE reaction". Such modified block copolymers contain functional moieties only in the diene block, unlike the present invention. In addition, such modified block copolymers are deficient because the ENE reaction depends on unsaturation in the base polymer for reaction sites. A reasonable amount of residual unsaturation must be present in order to obtain an advantageous degree of functional moieties onto the base polymer. Since the ENE reaction cannot be carried out so that all double bonds on the base polymer are scavenged, the result of such a process is a modified block copolymer which contains too high a level of unsaturation for successful impact modification of high processing temperature thermoplastics.

The present invention is a further attempt to improve the impact strength of polyarylene sulfide articles without reducing the advantageous mechanical properties inherent in polyarylene sulfide, including polyphenylene sulfide. It is also an object of the present invention to improve the impact strength of glass-reinforced polyarylene sulfide compositions. Although not limited to one particular use, the present invention will find use in improving the impact strength of filled and unfilled polyarylene sulfide compositions which are used to mold and encapsulate electronic component parts.

SUMMARY OF THE INVENTION

A polyarylene sulfide molding composition is provided with improved impact strength by the addition thereto of a thermally stable modified selectively hydrogenated high 1,2 content monovinyl aromatic/conjugated diene block copolymer wherein at least one functional group is grafted to the block copolymer primarily in the vinyl aromatic block and a silane. Examples of the modified block copolymers used in this invention are described in U.S. Pat. No. 4,783,503 which is incorporated herein by reference. Said patent describes the preparation of modified block copolymers by metallation, a process which does not require a base polymer with an undesirably high level of residual unsaturation.

More particularly, there is provided an impact resistant polymeric composition comprising:

(a) a polyarylene sulfide;
(b) at least 5 percent by weight of a functionalized selectively hydrogenated block copolymer of the formula $B_n(AB)_oA_p$ wherein $n=0,1$, $o=1,2\ldots$; $p=0,1$ to which has been grafted at least one electrophilic graftable molecule or electrophile wherein substantially all of said graftable molecules are grafted to the block copolymer in the vinylarene block; and
(c) a silane.

DETAILED DESCRIPTION OF THE INVENTION

Polyarylene Sulfide

Uncured or partially cured polyarylene sulfide polymers whether homopolymer, copolymer, terepolymer, and the like, or a blend of such polymers, can be used in the practice of this invention. The uncured or partially cured polymer is a polymer the molecular weight of which can be increased by either lengthening of a molecular chain or by cross-linking or by combination of both by supplying thereto sufficient energy, such as heat. Suitable polyarylene sulfide polymers include, but are not limited to, those described in U.S. Pat. No. 3,354,129, incorporated by reference herein.

Some examples of polyarylene sulfide compositions suitable for the purposes of this invention include poly(2,4-tolylene sulfide), poly(4,4'-biphenylene sulfide) and polyphenylene sulfide. Because of its availability and desirable properties such as high chemical resistance, nonflammability, and high strength and hardness polyphenylene sulfide is the presently preferred polyarylene sulfide. The polyarylene sulfide compositions may be a mixture of more than one polyarylene sulfide.

Particularly preferred polyarylene sulfides for use in this invention are disclosed in U.S. Pat. No. 4,645,826, the entire content of which is herein incorporated by reference. As disclosed therein a linear PAS of a markedly high molecular weight with a melt viscosity of about some thousands to some tens of thousands poise can be readily produced without the use of an aid by forming a PAS prepolymer of low to medium molecular weight according to a preliminary polymerization, then elevating the temperature by heating the polymerization system under strongly alkaline conditions with addition of a phase separating agent to the polymerization system, thereby separating the system into two liquid phases of high viscosity phase (polymer solution phase) and low viscosity phase (solvent phase), and carrying out the reaction under such a state.

The two-phase separated polymerization comprises dissolving an arylenesulfide prepolymer having a melt viscosity of 5 to 3,000 poise (at 310° C., shearing rate =200 (sec) $^{-1}$) in a poor solvent, i.e. water, under a strongly alkaline condition (in a pH range of from 9.5 to 14 of the reaction mixture when diluted 10-fold with water) in a temperature range of from 245° C. to 290° C. into a liquid-liquid two-phase separated state and maintaining this state for 1 to 50 hours to convert the arylenesulfide prepolymer into a high molecular weight polymer, then separating the polymer from the polymerization system and purifying the polymer after neutralization.

The process for production of a high to ultra-high molecular weight PAS according to U.S. Pat. No. 4,645,826 comprises, in general, forming PAS molecules through bonding between an alkali metal sulfide and a dihalo-aromatic compound and/or converting the PAS molecules into a high molecular weight polymer. PPS having melt viscosities of at least 3,000 poise can be produced by the process as disclosed therein including PPS having melt viscosities of at least 7,000 poise and much higher.

The starting materials for producing the prepolymer comprise an alkali metal sulfide, a dihalo-aromatic compound and a polymerization solvent. The alkali metal sulfide used includes lithium sulfide, sodium sulfide, potassium sulfide, rubidium sulfide, cesium sulfide and mixtures thereof. These alkali metal sulfides can be used as hydrates or aqueous mixtures, or in anhydrous forms. Among these alkali sulfides, sodium sulfide is the least expensive and is commercially preferred. It is also possible to use a small amount of an alkali metal hydroxide in combination in order to neutralize an acidic salt (e.g., alkali metal disulfides and alkali bicarbonates) which may sometimes occur in minute amount in an alkali metal sulfide.

The dihalo-aromatic compound used includes any of dihalo-aromatic compounds as disclosed in Japanese Laid-open Patent Publication No. 22926/1984. Particularly preferred are p-dichlorobenzene, m-dichlorobenzene, 2,5-dichlorotoluene, 2,5-dichloro-p-xylene, p-dibromobenzene, 1,4-dichloronaphthalene, 1-methoxy-2,5-dichlorobenzene, 4,4'-dichlorobiphenyl, 3,5-dichlorobenzoic acid, p,p'-dichlorodiphenylether, p,p'-dichlorodiphensulfone, p,p'-dichlorodiphenylsulfoxide, p,p'-dichlorodiphenylketone, and the like. Among these, those composed mainly of para-dihalobenzene, typically p-dichlorobenzene, are especially preferred.

By appropriate selection and combination of dihaloaromatic compounds, a random or block copolymer containing two or more different reaction units can be obtained. For example, when employing p-dichlorobenzene in combination with m-dichlorobenzene or p,p'dichlorodiphenylsulfone, a random or block copolymer containing:

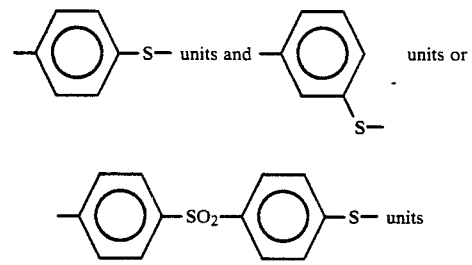

can be obtained. Further, a small amount of a polyhaloaromatic compound (e.g., trichlorobenzene) within the range which may provide some cross-linking but not substantially impair linearity may also be employed in combination, but no such compound is ordinarily required.

An organic amide solvent which is used in the polymerization step can be used for forming the prepolymer and can be selected from N-methylpyrrolidone (NMP), N-ethyl-pyrrolidone, N,N-dimethylformamide, N,N-dimethylacetamide, N-methylcaprolactam, tetramethylurea, hexamethylphosphorotriamide, and mixtures thereof. Among these, N-methylpyrrolidone is particularly preferred from viewpoints such as chemical stability and ability to produce readily a high molecular weight polymer. The organic amide as the polymerization solvent is desirably an aprotic compound. In the polymerization step for forming an ultra-high molecular linear polymer from the prepolymer, the above organic amide can of course be used. Otherwise, it is also possible to employ, for example, aromatic hydrocarbons ($C_6$-$C_{30}$), aliphatic hydrocarbons ($C_6$-$C_{30}$), ethers ($C_6$-$C_{30}$), ketones ($C_5$-$C_{30}$), pyridine or quinoline or derivatives of these ($C_5$-$C_{30}$), and mixtures thereof as such or as mixtures with organic amides.

In practicing the process, first, an alkali metal sulfide and a dihalo-aromatic compound are added into an organic solvent, desirably under an inert gas atmosphere, and the temperature is elevated to a desired temperature at which the reaction is carried out. Here, if the water content in the alkali metal sulfide is less than the desired content, the necessary amount of water is added for supplementation.

The preliminary polymerization is preferably conducted at a temperature in the range of from 160° to 260° C., particularly from 180° to 235° C. At a temperature lower than 160° C., the reaction rate is too slow, while at a temperature over 260° C., the PAS formed is liable to be decomposed to produce only a PAS with extremely low melt viscosity.

The end point of the preliminary polymerization step and the timing of turning from the preliminary polymerization to the two-phase separated polymerization, is preferably the point when the conversion of the dihalo-aromatic compound has reached 70 mole % to 98 mole %.

At the point of turning from the preliminary polymerization to the two-phase separated polymerization, the melt viscosity of the PAS is preferably in the range of from 5 to 300 poise. The range of from 10 poise to 200 poise is more suited for obtaining a PAS of a high polymerization degree with a melt viscosity of 1,000 poise or higher. With a viscosity less than 5 poise, formation of two-phase separation is insufficient, whereby decomposition of the polymerization system or lowering of the reaction rate will readily occur. With a viscosity over 300 poise, harmful substances will promote polymer cleavage will be accumulated in greater amount, whereby a lowering in polymer yield and decomposition of the polymer system will undesirably be caused.

The polymerization process as described in U.S. Pat. No. 4,645,826 is applicable for not only homopolymerization or random copolymerization but also for block copolymerization. For example, a purified p-phenylene prepolymer and a purified m-phenylene prepolymer can be dispersed in the same polymerization vessel to carry out the two-phase separated polymerization step, whereby a (p-phenylenesulfide)-(m-phenylenesulfide) block copolymer can readily be obtained.

SELECTIVELY HYDROGENATED BLOCK COPOLYMER

To improve the impact strength of the polyarylene sulfide, there is added thereto at least 5 wt.%, preferably from about 10 to about 30 wt.%, and, more preferably about 10 to about 20 wt.% based on the total composition of a selectively hydrogenated block copolymer elastomer which has been modified to contain carboxyl functionality. The impact modifiers of this invention are fully disclosed in the aforementioned U.S. Pat. No. 4,783,503.

Modified Block Copolymers

The modified block copolymers according to the present invention are grafted or substituted in the vinylarene block as shown in the exemplary reaction given below:

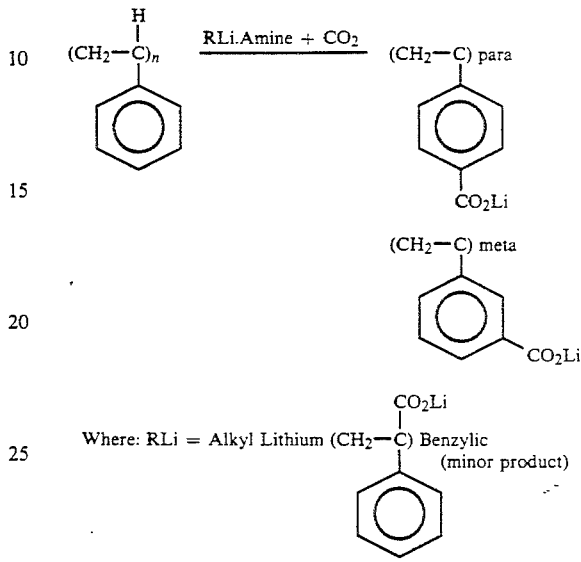

The structure of the substituted block copolymer specifically determined by the location of the functionality on the polymer backbone in the vinylarene block gives the block copolymer a substantially greater degree of thermal stability.

Block Copolymer Base

Block copolymers of conjugated dienes and vinyl aromatic hydrocarbons which may be utilized include any of those which exhibit elastomeric properties and those which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A—B, A—B—A, A—B—A—B, B—A—B,$(AB)_{0,1,2}$ . . . BA and the like wherein A is a polymer block of vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedure including the well known sequential addition of monomer techniques, incremental addition of monomer technique or coupling technique as illustrated in, for example, U.S. Pat. No. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. No. 3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene (isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepare copolymers included styrene, o-methylstyrene, p-methylstyrene, p-tert-butylstyrene, 1,3-dimethylstyrene, alphamethylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

Graftable Compounds

In general, any materials having the ability to react with the base polymer, are operable for the purposes of this invention.

In order to incorporate functional groups into the base polymer, monomers capable of reacting with the base polymer are necessary. Monomers may be polymerizable or nonpolymerizable, however, preferred monomers are nonpolymerizable or slowly polymerizing.

The class of preferred electrophiles which will form graft polymers within the scope of the present invention include reactants from the following groups: carbon dioxide, ethylene oxide, aldehydes, ketones, carboxylic acid slats, their esters and halides, epoxides, sulfur, boron alkoxides, isocyanates and various silicon compounds.

These electrophiles may contain appended functional groups as in the case of N,N-diethyl-p-amino benzaldehyde where the amine is an appended functional group and the aldehyde is the reactive electrophile. Alternatively, the electrophile may react to become the functional site itself; as an example, carbon dioxide (electrophile) reacts with the metalated polymer to form a carboxylate functional group. By these routes, polymers could be prepared containing grafted sites selected from one or more of the following groups of functionality type: carboxylic acids, their salts and esters, ketones, alcohols and alkoxides, amines, amides, thiols, borates, and functional groups containing a silicon atom.

These functionalities can be subsequently reacted with other modifying materials to produce new functional groups. For example, the grafted carboxylic acid described above could be suitably modified by esterifying the resulting acid groups in the graft by appropriate reaction with hydroxy-containing compounds of varying carbon atom lengths. In some cases, the reaction could take place simultaneously with the grafting process but in most examples it would be practiced in subsequent post modification reaction.

The grafted polymer will usually contain from 0.02 to 20, preferably 0.1 to 10, and most preferably 0.2 to 5 weight percent of grafted portion.

Preparation of the Modified Block Copolymer

The polymers may be prepared by any convenient manner one of which is described in aforementioned U.S. Pat. No. 4,783,503.

An example of a method to incorporate functional groups into the base polymer primarily in the vinylarene block is metallation.

Metalation is carried out by means of a complex formed by the combination of a lithium component which can be represented by $R'(Li)_x'$ with a polar metalation promoter. The polar compound and the lithium component can be added separately or can be premixed or pre-reacted to form an adduct prior to addition to the solution of the hydrogenated copolymer. In the compounds represented by $R'(Li)_x'$, the $R'$ is usually a saturated hydrocarbon radical of any length whatsoever, but ordinarily containing up to 20 carbon atoms, and can be an aromatic radical such as phenyl, naphthyl, tolyl, 2-methylnaphthyl, etc., or a saturated cyclic hydrocarbon radical of e.g., 5 to 7 carbon atoms, an unconjugated, unsaturated aliphatic hydrocarbon radical of 1 to 20 carbon atoms or an alkyllithium having one or more aromatic groups on the alkyl group, the alkyl group containing 1 to 20 carbon atoms. In the formula, $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product metalated alkyl. Of course, other alkali metal or alkaline earth metal alkyls could be used but the lithium alkyls are preferred due to their ready commercial availability. In a similar way, metal hydrides could be employed as the metalation reagent but the hydrides have only limited solubility in the appropriate solvents. Therefore, the metal alkyls are preferred and their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly. Some lithium compounds can be used alone effectively, notably the menthyllithium types.

It has been shown that the metalation occurs at a carbon to which an aromatic group is attached, or in an aromatic group, or in more than one of these positions.

In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. The distinguishes the lithiated copolymers from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyllithium alkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $(R^2)_2N-C_yH_{2y}-N(R^2)_2$ in which each $R^2$ can be the same or different, straight- or branched-chain alkyl group of any chain length containing up to 20 carbon atoms or more all of which are included herein and, y can be any whole number from 2 to 10, and particularly the ethylene diamines in which all alkyl substitutents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, triethylenediamine, and the like.

Tertiary monoamines such as triethylenediamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

Polar metalation promotors may be present in an amount sufficient to enable metalation to occur, e.g., amounts between 0.01 and 100 or more preferably between 0.1 to about 10 equivalents per equivalent of lithium alkyl.

The equivalents of lithium employed for the desired amount of lithiation generally range from such as about 0.001-3 per vinyl arene unit in the copolymer, presently preferably about 0.01-1.0 equivalents per vinyl arene unit in the copolymer to be modified. The molar ratio of active lithium to the polar promoter can vary from such as 0.01 to 10.0. A preferred ratio is 0.5.

The amount of alkyl lithium employed can be expressed in terms of the Li/vinylarene molar ratio. This ratio may range from a value of 1 (one lithium alkyl per vinylarene unit) to as low as $1 \times 10^{-3}$ (1 lithium alkyl per 1000 vinylarene units).

The process of lithiation can be carried out at temperatures in the range of such as about $-70°$ C. to $+150°$ C., presently preferably in the range of about 25° C. to 60° C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperatures. Generally, the time can range from a few seconds to about 72 hours, presently preferable from about 1 minute to 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species must contain functional groups capable of undergoing nucleophilic attack by a lithium anion. Such species contain functional groups including but not limited to:

$$\begin{array}{ll}
\overset{O}{\underset{\|}{-C}}-O- & \text{carboxyl} \\
C-OH & \text{hydroxyl} \\
C-OR & \text{ether} \\
\overset{O}{\underset{\|}{-C}}-R & \text{ketone} \\
\overset{O}{\underset{\|}{-C}}-H & \text{aldehyde} \\
C-NR_2 & \text{Amine} \\
\overset{O}{\underset{\|}{C}}-NR_2 & \text{Amide} \\
C-SH & \text{Thiol} \\
C-B(OR)_2 & \text{Borane Containing} \\
C-\underset{|}{\overset{|}{Si}}- & \text{Silicone Containing}
\end{array}$$

The process also includes further chemistry on the modified block copolymer. For example, converting of a carboxylic acid salt containing modified block copolymer to the carboxylic acid form can be easily accomplished.

SILANE

It has also been found that the addition of a silane compound to the polyarylene sulfide composition of the present invention can enhance the physical properties of the blend including elongation. Thus, the silane which can be used can include one or more alkoxy silanes selected from among aminoalkoxysilane, epoxyalkoxysilane, mercaptoalkoxysilane and vinylalkoxysilane.

The aminoalkoxysilane may be any silane compound as far as it has at least one amino group and two or three alkoxy groups per molecule, and examples thereof include γ-aminopropyltriethoxysilane, γ-aminopropyltrimethoxysilane, γ-aminopropylmethyldiethoxysilane, γ-aminopropylmethyldimethoxysilane, N-β(aminoethyl)-γ-aminopropyltriethoxysilane, N-β-(aminoethyl)-γ-aminopropyltrimethoxysilane, N-γ-(aminoethyl)-γ-aminopropylmethyldiethoxysilane, N-β(aminoethyl)-γ-aminopropylmethyldimethoxysilane, N-phenyl-γ-aminopropyltriethoxysilane, and N-phenyl-γ-aminopropyltrimethoxysilane.

The epoxyalkoxysilane may be any silane compound as far as it has at least one epoxy group and two or three alkoxy groups per molecule, and examples thereof include Y-glycidoxypropyltrimethoxysilane, β-(3,4-epoxycyclohexyl)ethyltrimethoxysilane, and γ-glylcidoxypropyltriethoxysilane.

The mercaptoalkoxysilane may be any silane compound as far as it has at least one mercapto group and two or three alkoxy groups per molecule, and examples thereof include γ-mercaptopropyltrimethoxysilane and γ-mercaptopropyltriethoxysilane.

The vinylalkoxysilane may be any silane compound as far as it has at least one vinyl group and two or three alkoxy groups per molecule, and examples thereof include vinyltriethoxysilane, vinyltrimethoxysilane and vinyltris(β-methoxyethoxy)silane.

The amount of the above-described alkoxysilane used in the present invention is 5 wt.% or less, preferably 0.1–3 wt.% based on the total weight of the polyarylene sulfide resin blend. When the amount is too small, no significant effect intended in the present invention can be attained, while when the amount is too large, mechanical properties are unfavorably lowered.

THE BLEND

Mineral fillers and glass fillers can be present in the compositions of this invention in a total amount of up to about 65 weight percent of the total composition, preferably in a range of about 30 to about 60 weight percent of the total composition. Mineral fillers useful in this invention can be chosen from those materials such as calcium carbonate, calcium sulfate, talc, mica, and the like, while the glass materials can be chosen from any of those products commercially available which generally find use as fillers and reinforcing agents in polymeric blends. These can be chosen from fiberglass or glass beads, for instance, with the preferred material for this invention being glass fiber.

As is usual in polymeric blends based on polyarylene sulfide, a variety of other additives can be used in minor amounts of up to about 5% by weight of the total composition. These additives include such materials as flow improving agents, silanes and pigments.

Processability agents that can be employed in the inventive composition can be selected from among solid ethylene polymers (see U.S. Pat. No. 4,134,874), saturated fatty acids such as zinc stearate and the N,N'-alkylene bis(alkanamides), glycerides and phosphated glycerides of saturated fatty acids containing from 10 to 30 carbon atoms, mono- and di-alkanolamides derived from saturated acids and esters derived from a saturated long-chain fatty acid and long-chain saturated aliphatic alcohol. General fillers such as lithium carbonate are also suitable as processability agents.

The polyarylene sulfide resin composition of the present invention can be prepared, for example, by mixing predetermined amounts of the polyarylene sulfide resin, impact modifier, and, optionally, glass fibers by means of a usual mixer, for example, a tumble mixer; by melt-kneading the mixture by means of an extruder or kneader, and, if necessary, by pelletizing the melt-kneaded mixture.

Once made, the compositions of the present invention can be used to make molded articles in accordance with any method suitable and known in the art. Compositions of the present invention are especially suited for injection molding wherein the composition is introduced into an injection molding apparatus to produce a melt which is extruded into an injection mold which conforms to the part to be molded.

The improved polyarylene sulfide compositions of this invention can be used to make electronic components such as, but certainly not limited to, connectors, bobbins, coils, relays, etc. This aspect of the invention includes all electronic components that can be at least partially made from a resinous composition such as a polyarylene sulfide composition.

In accordance with another aspect of this invention, electronic components can be encapsulated with the polyarylene sulfide composition of this invention. The electronic components to be encapsulated in accordance with this aspect of the invention broadly includes all electronic components, i.e. devices, parts, etc., for which encapsulation is desired. Many electronic components have been manufactured or encapsulated with polyarylene sulfide compositions or have been suggested as being capable of made or encapsulated with polyarylene sulfide compositions, and this invention is not intended to be narrow in scope to any specific components mentioned, but include any and all electronic components which can be manufactured from polyarylene sulfide molding compositions.

EXAMPLE 1

Polyphenylene sulfide (PPS) compositions were prepared with varying amounts of different hydrogenated block copolymer impact modifiers. Non-filled and glass filled compositions were prepared. The samples were tested for impact strength, e.g., notched and unnotched izod, and for other physical properties by standard ASTM methods. Instrumented impact was measured by a rheometric drop weight tester using 2 or 4 inch disks and 33 pound drop weight.

All formulations were made from Fortron ® PPS, Hoechst Celanese, and Kraton ® impact modifier, Shell Oil Co. Samples 1, 3, 4, and 5 are ungrafted hydrogenated block copolymers or block copolymers which have the mentioned grafts at the diene block. Sample 2 comprises an impact modifier of the present invention. The compositions were extruded on a Haake conical twin screw extruder (System 90) at 295°–315° C. nozzle temperature and injected in the mold at a mold temperature of 125°–135° C. A lubricant (PETS) was added at 0.3% to all formulations. In the case of glass formulations, precompounded PPS/glass compositions (40% glass) were used to insure uniformity of mixing with the impact additives. Compositions and the results of testing are shown in Tables 1 and 2.

strumented impact did not show any dramatic improvements of Sample 2 relative to the other impact modifiers tested, but did demonstrate that this formulation had the highest total energy of those tested. Only Sample 2 had

TABLE 1

IMPACT PROPERTIES

| Sample No. | Impact Modifier Type | Impact Level % | Glass % | Instrumental Impact | | | Izod | |
|---|---|---|---|---|---|---|---|---|
| | | | | Peak Force lbs. | Total Energy in. lbs. | Type Shatter/ Break | Notched ft. lbs./ in. notch | Unnotched ft. lbs./ in. notch |
| 1. | SEBS - | 10 | | 141 | 10 | Brittle | .53 | 25.9 |
| | Maleanated | 20 | | 207 | 21 | Brittle | 1.03 | N.B. |
| | (<.6%) | 10 | 36 | 177 | 31 | Brittle | 1.15 | 8.71 |
| 2. | SEP - | 10 | | 767 | 312 | Ductile | 1.55 | 46.9* |
| | Carboxyl | 20 | | 605 | 251 | Ductile | 5.26* | N.B. |
| | (<1%) | 10 | 36 | 197 | 45 | Brittle | 1.87 | 9.87 |
| | | 5** | 38 | | | | 1.38 | |
| 3. | SEBS | 10 | | 702 | 288 | Brittle | | |
| | | 20 | | 650 | 204 | Brittle | 1.43 | N.B. |
| | | 10 | 36 | 197 | 32 | Brittle | 1.43 | 8.72 |
| | | 5** | 38 | | | | 1.47 | |
| 4. | SEBS - | 10 | | 200 | 13 | Brittle | | |
| | Vinyl | 20 | | 472 | 130 | Brittle | .87 | 15.3 |
| | triethoxy silane (<1%) | 10 | 36 | 195 | 30 | Brittle | 1.27 | 9.72 |
| 5. | SEP - | 10 | | 667 | 96 | Brittle | | |
| | Maleanated | 20 | | 494 | 123 | Brittle | .95 | 22.3 |
| | (<1.0%) | 10 | 36 | 184 | 30 | Brittle | 1.36 | 8.81 |
| 6. | Control | — | | 163 | 6.9 | Brittle | .54 | 12.9 |
| | | — | 40 | 190 | 24 | Brittle | 1.11 | 8.1 |
| | | — | 40** | | | | 1.25 | |

*40% no break
**compounded separately from other samples
S = Styrene
B = Butylene
E = Ethylene
P = Propylene

TABLE 2

| Sample No. | Impact Level % | Yield psi × 10$^5$ | Modulus psi × 10$^5$ | Elongation at break % | 5% Strain psi × 10$^3$ | Modulus psi × 10$^5$ | HDT @ 264 |
|---|---|---|---|---|---|---|---|
| 1. | 10 | 9.98 | 4.3 | 16.7 | 17.7 | 4.9 | — |
| | 20 | 8.05 | 3.4 | 41.2 | 12.8 | 3.77 | 97 |
| +36% Glass | 10 | 15.1 | 12.2 | 2.17 | 24.0 | 11.9 | 218 |
| 2. | 10 | 8.35 | 3.9 | 31.4 | 14.9 | 4.4 | 97 |
| | 20 | 5.57 | 2.6 | 22.4 | 9.6 | 3.0 | 90 |
| +36% Glass | 10 | 14.4 | 12.6 | 2.5 | 23.4 | 12.3 | 184 |
| +38% Glass | 5** | 18.2 | 16.7 | 1.9 | 32.8 | 1.8 | 251 |
| 3. | 10 | 8.04 | 3.7 | 44.2 | 14.1 | 4.2 | 98 |
| | 20 | 6.01 | 2.8 | 127 | 10.0 | 3.0 | 97 |
| +36% Glass | 10 | 15.5 | 13.5 | 2.5 | 24.7 | 12.7 | 239 |
| +38% Glass | 5** | 19.1 | 16.3 | 1.9 | 31.4 | 1.7 | 238 |
| 4. | 10 | 9.35 | 3.5 | 18.1 | 16.6 | 4.6 | 101 |
| | 20 | 7.38 | 3.2 | 20.5 | 11.8 | 3.5 | 98 |
| +36% Glass | 10 | 16.3 | 14.6 | 2.4 | 26.0 | 13.4 | 239 |
| 5. | 10 | 9.94 | 3.6 | 11.4 | 17.7 | 4.9 | 101 |
| | 20 | 8.31 | 3.6 | 9.3 | 13.5 | 3.9 | 97 |
| +36% Glass | 10 | 16.2 | 14.2 | 2.2 | 25.5 | 13.2 | 235 |
| 6. Control | — | 12.7 | 5.1 | 7.1 | 22.0 | 5.8 | 104 |
| +40% Glass | — | 20.1 | 13.7 | 1.9 | 32.0 | 17.5 | 256 |
| +40% Glass | — | 20.7 | 21.4 | 1.5 | 36.3 | 2.1 | 255 |

**Compounded separately

Non-filled

From Table I, it can be seen that a dramatic increase in the notched izod value was obtained with the carboxyl-modified impact modifier of this invention, Sample 2. At a 20% level, Sample 2 compares most favorably versus the PPS control (5.3 vs 0.54 ft. lbs. per inch of notch) and versus any of the other modifiers tested. The data does not reflect the fact that 40% of the samples tested were "no break" with this modifier. Similarly, unnotched data at 10% incorporation of the impact modifier of this invention exhibited a 4X increase vs a PPS control (47 vs 12.9 ft. lbs. per inch of notch). Instrumented ductile breaks at 20% incorporations.

Further, simply maleanating the Kraton ® was not sufficient to achieve improvements in impact resistance. The maleanated triblock, Sample 1, had very poor instrumented impact measurements.

Filled

In glass filled formulations (10% modifier/36% glass), a moderate improvement was found with the addition of the impact modifier of the present invention vs a 40% glass/PPS filled control where notched izod values (1.9 vs 1.1 ft./lbs. /in. of notch) and instrumented impact total energies (45 vs 24 in. lbs) were found. All other modifiers yielded only slight improvements in the glass filled formulations.

Physical properties (i.e. tensile and flex strength), Table 2, were expectedly affected wit the introduction of these impact modifiers. Results in unfilled systems mirrored those in the filled systems. Elongation was increased in every case (especially for Sample 2). Thermal properties (HDT) appeared to be related to the impact modifier chose, but reductions were obtained in all cases. Reductions were also found for the Sample 2 system which had superior impact properties.

EXAMPLE 2

Additional samples of Kraton® impact-modified Fortron® PPS were formulated. All samples were compounded on a 28 mm ZSK extender. An extrusion temperature of about 320° C. was used. Mold temperatures were the same as in Example 1. Difficulties were encountered in extruding highly filled systems. In highly filled glass/mineral formulations, a lower viscosity PPS resin was used. Compositions and results of testing are shown in Tables 3-6.

TABLE 3
PHYSICAL PROPERTIES

| Sample No. | Impact Modifier Type | Glass % | Impact Level % | Silane[1] % | Tensile BK psi × 10³ | Modulus psi × 10⁶ | Elongation % | Flex Stress psi × 10³ | Modulus psi × 10⁶ | Flex Strain @ KB % | UL 94 ⅛" |
|---|---|---|---|---|---|---|---|---|---|---|---|
| 1. | SEP - | 45 | 20 | .5 | 10.33 | 1.40 | 1.43 | 14.88 | 1.33 | 1.51 | F |
| 2. | Carboxyl | 45 | 5 | .5 | 19.52 | 1.85 | 1.78 | 31.10 | 1.80 | 2.08 | V-0 |
| 3. | (<1%) | 30 | 20 | .5 | 12.54 | 1.16 | 2.08 | 19.87 | 1.13 | 2.24 | V-0 |
| 4. | " | 30 | 5 | .5 | 14.88 | 1.24 | 2.12 | 24.03 | 1.20 | 2.43 | V-0 |
| 5. | " | 40 | 12.5 | .5 | 17.04 | 1.88 | 1.77 | 27.14 | 1.74 | 2.03 | V-0 |
| 6. | " | 40 | 12.5 | — | 14.06 | 1.35 | 1.93 | 22.35 | 1.28 | 2.23 | V-0 |
| 7. | Control | 40 | — | .5 | 22.20 | 1.91 | 1.91 | 34.20 | 1.78 | 2.21 | V-0 |
| 8. | Kraton 1651® | 40 | 12.5 | .5 | 17.19 | 1.61 | 2.56 | 28.65 | 1.58 | 2.50 | V-1 |
| 9. | Kraton 1650® | 40 | 12.5 | .5 | 12.31 | 1.23 | 2.34 | 20.47 | 1.24 | 2.39 | V-1 |
| 10. | Kraton 1652® | 40 | 12.5 | .5 | 11.56 | 1.18 | 1.78 | 18.86 | 1.28 | 2.01 | V-0 |

[1]A1100, Union Carbide

TABLE 4
THERMAL AND IMPACT PROPERTIES

| Sample No. | Glass % | Impact Level % | Silane[1] % | HDT @ 264 psi | Izod ft. lbs./ in. notch | Total Energy in. lbs. | Instrumented Peak Force lbs | Type Shatter | Deflection @ Crack Init. Mils |
|---|---|---|---|---|---|---|---|---|---|
| 1. | 45 | 20 | .5 | 215 | 2.41 | 57 | 212 | B | 196 |
| 2. | 45 | 5 | .5 | 259 | 1.69 | 43 | 262 | B | 186 |
| 3. | 30 | 20 | .5 | 217 | 2.18 | 46 | 190 | B | 255 |
| 4. | 30 | 5 | .5 | 237 | 1.53 | 33 | 196 | B | 215 |
| 5. | 40 | 12.5 | .5 | 256 | 1.76 | 46 | 232 | B | 223 |
| 6. | 40 | 12.5 | — | 229 | 1.55 | 36 | 208 | B | 214 |
| 7. | 40 | — | .5 | 255 | 1.39 | 33 | 236 | B | 175 |
| 8. | 40 | 12.5 | .5 | 247 | 1.37 | 36 | 221 | B | 224 |
| 9. | 40 | 12.5 | .5 | 200 | 1.49 | 30 | 155 | B/D | 208 |
| 10. | 40 | 12.5 | .5 | 176 | 1.28 | 33 | 164 | B/D | 209 |

[1]A1100, Union Carbide

TABLE 5
IMPACT DATA FOR UNFILLED PPS

| Sample No. | Impact Modifier Type | Impact Level % | Notched Izod ft. lbs./ | Total Energy in. lbs. | Peak Force lbs. | Deflection at Crack Initiation Mils. | Type of Break | UL 94 (⅛" 0 |
|---|---|---|---|---|---|---|---|---|
| 1. | SEP Carboxyl (<1%) | 5% | .66 | 14.2 | 198 | 108 | B | V-0 |
| 2. | " | 10 | 1.69 | 278 | 795 | 423 | D | V-0 |
| 3. | " | 20 | 3.53 | 218 | 620 | 457 | D | V-0 |
| 4. | " | 25 | 7.76 | 211 | 515 | 475 | D | V-0 |
| 5. | Kraton 1651® | 25 | 1.88 | 170 | 468 | 524 | B | F |
| 6. | Kraton 1650® | 25 | .90 | 104 | 559 | 380 | B | F |
| 7. | Kraton 1652® | 25 | 1.04 | 243 | 617 | 489 | B | F |
| Control | — | — | .54 | 5.9 | 147 | 61 | B | V-0 |

TABLE 6
EFFECT OF MOLECULAR WEIGHT OF ADDITIVE (KRATON SEBS) ON PROPERTIES

| Impact Modifier Type | Molecular Weight | Tensile at BK psi × 10³ | Flex Strain at BK % | Modulus psi × 10⁶ | HDT °C. | N.I. ft. lbs./ in. notch | Total Energy in. lbs. | Peak Force lbs. | UL 94 ⅛" | 1/16" | 1/32" |
|---|---|---|---|---|---|---|---|---|---|---|---|
| 1651® | 200,000 | 17.2 | 2.50 | 1.61 | 247 | 1.37 | 36 | 221 | V-1 | F | F |

TABLE 6-continued

EFFECT OF MOLECULAR WEIGHT OF ADDITIVE (KRATON SEBS) ON PROPERTIES

| Impact Modifier Type | Molecular Weight | Tensile at BK psi × 10³ | Flex Strain at BK % | Modulus psi × 10⁶ | HDT °C. | N.I. ft. lbs./ in. notch | Total Energy in. lbs. | Peak Force lbs. | UL 94 ⅛" | 1/16" | 1/32" |
|---|---|---|---|---|---|---|---|---|---|---|---|
| 1650 ® | 70,000 | 12.3 | 2.39 | 1.23 | 200 | 1.49 | 30 | 155 | | | |
| 1652 ® | 50,000 | 11.6 | 2.01 | 1.18 | 176 | 1.28 | 33 | 164 | | | |
| SEP Carboxyl | 70,000 | 17.1 | 2.03 | 1.88 | 256 | 1.76 | 46 | 232 | V-0 | V-1 | V-1 |

Effect of Impact Modifier Level in Unfilled Systems (Table 5)

It can be seen that the notched izod values varied linearly with the concentration of the impact modifier of this invention (Sample Nos. 1–4) and at the 25% yielded a superior notched izod impact relative to the ungrafted commercial impact modifiers (Samples 5–7). Instrumented impact total energy and peak force seemed to maximize at 10% impact modifier, whereas deflection at crack initiation varied linearly with the level of impact modifier. Use of non-grafted Kratons ® of varying molecular weight (Samples 5–7) indicated that notched izod impact was maximized at the highest molecular weight Kraton 1651 ®, whereas the lower molecular weight impact modifier, Kraton 1652 ®, had higher total energy and peak force values.

Glass/Impact Levels (Table 4)

It can be seen that notched izod and instrumented impact levels were positively influenced by increases in both glass and impact level, whereas HDT levels were positively influenced only by increases in the glass level.

Effect of Silane (Tables 3 and 4)

Addition of silane to the 40% glass and 12.5% impact modified composition (Sample 5) resulted in a marked improvement in the physical, impact and HDT property profile of the formulations. Compare with Sample 6. This may be related to the ability of this additive to couple to the glass, impact modifier and PPS matrix.

Effect of Molecular Weight of the Kraton ® (Table 6)

It can be seen from Table 6 that the molecular weight of the block copolymer can have a major effect on the resulting property profile of the PPS blend. The impact modifier of the present invention has a molecular weight about equal to Kraton 1650 ® but was found to have similar properties to the higher molecular weight Kraton 1651 ®.

Flame Resistance

It has unexpectedly been found that PPS compositions which contain the impact modifier of the present invention have improved flame resistance relative to PPS compositions which contain similar impact modifiers.

In order for a material to attain the self-extinguishing grades V-0 and V-1 regulated in the flammability test according to Underwriters Laboratories Bulletin 94 (hereinafter abbreviated to "UL-94"), the material is required to have a short combustion time and not to ignite cotton placed below the material due to dripping caused at the time of combustion.

Referring to Table 3, it can be seen that the glass filled compositions except for one instance passed the flammability test, each having a V-0 or V-1 UL-94 rating. Even the ungrafted Kraton samples had sufficient flame resistance. However, the unfilled samples showed a substantial difference utilizing the impact modifier of the present invention (Table 5). Thus, all of the four PPS compositions which contained the impact modifier of the present invention including the control which did not contain an impact modifier passed the flammability test. The ungrafted Kraton ® materials each failed the test. In Table 6, it can be seen that even the glass filled ungrafted Kratons ® failed the flammability test as the test bar was reduced in size. The impact modified PPS compositions of this invention maintained the V-0 and V-1 ratings.

EXAMPLE 3

Further samples of filled and impact modified Fortron ® PPS were formulated and molded as in Example 2. The addition of aminosilane was tested to determine the effect such addition had on the physical, impact and flammability properties of the sample. The aminosilane was gamma-aminopropyl triethoxysilane, A110, Union Carbide. Compositions and test results are provided in Tables 7–9.

TABLE 7

PHYSICAL PROPERTIES

| Sample No. | Kraton ® Modifier | Level % | Level Amino Silane | Tensile Str Kpsi | Elong % | Flex Str Kpsi | Flex Strain % | Flex Modulus Kkpsi | HDT at 264 psi |
|---|---|---|---|---|---|---|---|---|---|
| GLASS FILLED (40%) PPS COMPOSITIONS | | | | | | | | | |
| 1 | 2821[2] | 8 | .5 | 18.04 | 2.17 | 29.0 | 2.23 | 1.70 | 237 |
| 2 | " | 8 | — | 15.95 | 1.71 | 24.9 | 1.83 | 1.63 | 238 |
| 3 | 1901[1] | 8 | .5 | 9.12 | .70 | 15.0 | 1.10 | 1.56 | 234 |
| 4 | " | 8 | — | 10.51 | 1.89 | 17.0 | 1.96 | 1.23 | 119 |
| 5 | 1651[3] | 8 | .5 | 18.2 | 2.23 | 29.9 | 2.43 | 1.67 | 236 |
| 6 | " | 8 | — | 16.73 | 2.38 | 27.4 | 2.49 | 1.44 | 240 |
| 7 | 2821 | 6 | .5 | 17.31 | 1.89 | 27.2 | 2.01 | 1.63 | 235 |
| 8 | 2821 | 10 | .5 | 14.67 | 1.86 | 23.6 | 1.93 | 1.56 | 224 |
| 9 | 6501[4] | 8 | .5 | 18.67 | 2.23 | 29.8 | 2.42 | 1.63 | 240 |
| 10 | " | 8 | — | 15.89 | 1.80 | 24.1 | 2.02 | 1.43 | 238 |
| 11 | Control | — | .5 | 22.8 | 1.95 | 33.9 | 2.03 | 1.90 | 250 |

Glass/Calcium Carbonate
(33/33%) PPS Compositions

TABLE 7-continued

| | | | PHYSICAL PROPERTIES | | | | | | |
|---|---|---|---|---|---|---|---|---|---|
| Sample No. | Kraton ® Modifier | Level % | Level Amino Silane | Tensile Str Kpsi | Elong % | Flex Str Kpsi | Flex Strain % | Flex Modulus Kkpsi | HDT at 264 psi |
| 12 | 2821 | 3 | .5 | 15.0 | 1.31 | 22.7 | 1.29 | 2.26 | 253 |
| 13 | 1651 | 3 | .5 | 14.4 | 1.14 | 22.0 | 1.21 | 2.25 | 250 |
| 14 | — | — | — | 15/0 | 1.0 | 22.4 | 1.07 | 2.43 | 254 |

[1]SEBS Maleanated (<.6%)
[2]SEP - Carboxyl (<1%)
[3]SEBS
[4]SEBS - Vinyl triethoxy silane (<1%)

TABLE 8

| | | | INPUT AND SURFACE ON PROPERTIES | | | |
|---|---|---|---|---|---|---|
| | | | | Rheometrics | | |
| Sample No. | Kraton ® Modifier | Level % | Amino Silane % | N.I. ft. lbs. in. | Peak Force lbs. | Total Energy in. lbs. | Total Distance mils |
| GLASS FILLED (40%) PPS COMPOSITIONS | | | | | | | |
| 1 | 2821 | 8 | .5 | 2.24 | 180 | 10.3 | 121 |
| 2 | " | 8 | — | 1.60 | 205 | 14.0 | 117 |
| 3 | 1901 | 8 | .5 | .91 | 228 | 12.4 | 132 |
| 4 | " | 8 | — | 1.20 | 619 | 35.0 | 198 |
| 5 | 1651 | 8 | .5 | 1.71 | 247 | 43.1 | 277 |
| 6 | " | 8 | — | 1.59 | 196 | 31.8 | 263 |
| 7 | " | 6 | .5 | 1.73 | — | — | — |
| 8 | 2821 | 10 | .5 | 1.76 | — | — | — |
| 9 | 6501 | 8 | .5 | 1.72 | 241 | 44.2 | 310 |
| 10 | " | 8 | — | 1.38 | 281 | 30 | 204 |
| 11 | Control | — | .5 | 1.32 | 170 | 30.1 | 307 |
| Glass/Calcium Carbonate (33/33%) PPS Compositions | | | | | | | |
| 12 | 2821 | 3 | .5 | .75 | 195 | 37 | 267 |
| 13 | 1651 | 3 | .5 | .67 | 159 | 22.1 | 221 |
| 14 | — | — | — | .64 | 262 | 51 | 194 |

TABLE 9

| | | FLAMMABILITY | | | |
|---|---|---|---|---|---|
| Sample No. | Modifier Kraton | Level % | Amino Silane % | ⅛" | 1/16" | 1/32" |
| GLASS FILLED (40%) PPS COMPOSITIONS | | | | | | |
| 1 | 2821 | 8 | .5 | V-0 | V-1 | V-1 |
| 2 | 2821 | 12.8 | .5 | V-1 | V-1 | V-1 |
| 3 | 2821 | 8 | — | V-1 | V-1 | V-1 |
| 4 | | 12.5 | — | V-0 | V-1 | V-1 |
| 5 | 1901 | 8 | .5 | V-0 | V-1 | F |
| 6 | 1901 | 12.5 | .5 | F | F | F |
| 7 | 1901 | 8 | — | V-0 | V-1 | F |
| 8 | 1901 | 12.5 | — | F | F | F |
| 9 | 1651 | 8 | .5 | V-1 | V-1 | F |
| 10 | 1651 | 12.5 | .5 | V-1 | F | F |
| 11 | 1651 | 8 | — | V-1 | F | F |
| 12 | 1651 | 12.5 | — | V-1 | F | F |
| 13 | 2821 | 6 | .5 | V-0 | V-1 | V-1 |
| 14 | 2821 | 10 | .5 | V-0 | V-1 | V-1 |
| 15 | 6501 | 8 | .5 | V-0 | V-2 | F |
| 16 | " | 12.5 | .5 | F | F | F |
| 17 | " | 8 | — | V-0 | F | F |
| 18 | " | 12.5 | — | F | F | F |
| 19 | | | | V-0 | V-0 | V-0 |
| Glass/Calcium Carbonate (33/33%) PPS COMPOSITIONS | | | | | | |
| 20 | 2821 | 3 | .5 | V-0 | V-0 | V-0 |
| 21 | 2821 | 3 | .5 | V-0 | V-0 | V-0 |
| 22 | 2821 | 5 | .5 | V-0 | F | F |
| 23 | 1651 | 7 | .5 | V-0 | V-2 | V-2 |
| 24 | 1651 | 3 | .5 | V-0 | V-1 | F |
| 25 | Control | 5 | .5 | V-0 | V-0 | V-0 |

It can be seen in Tables 7 and 8 that the addition of aminosilane uniformly improved physical properties, improving tensile and flexural properties. However, only in the case of the Kraton ® 2821(carboxyl modified) and 6501 (silane modified) runs, did elongation and notched izod impact both increase significantly. Some changes in the practical impact were noted as well. This was unexpected in that increased tensile strength generally leads to more brittle (lower elongation) materials. Blends employing Kraton ® 1901 generally did not follow this pattern and had poor physical properties regardless of the presence of the aminosilane. Both Kraton ® 1901 and 2821 have a carboxyl functionality. However, it is evident that having this functionality on the aliphatic backbone (1901) vs the styrene ring (2821) makes a large difference in the resulting blend. Only minor effects for aminosilane addition were seen in HDT values except for the Kraton ® 1901 blend.

Flammability values (Table 9) were only acceptable for the control (VO at all thicknesses), although the blend containing the impact modifier of this invention (2821) had better flame retardance than the others.

What is claimed is:

1. An impact resistant polyarylene sulfide composition comprising: (a) polyarylene sulfide, (b) and an impact strength improving amount of a functionalized selectively hydrogenated block copolymer of the formula $B_n(AB)_oA_p$ where n=0 or 1, o=1-50, p=0 or 1, each A is predominantly a polymerized monoalkenyl aromatic or vinyl arene hydrocarbon block and each B prior to hydrogenation is predominantly a polymerized conjugated diene hydrocarbon block, to which block copolymer has been grafted at least one graftable functional molecule selected from the group consisting of an electrophilic graftable molecule containing a carboxyl functional group and an electrophile, wherein said electrophile is carbon dioxide, wherein substantially all of said electrophilic graftable molecules or electrophiles are grafted to the block copolymer in the monoalkenyl aromatic or vinyl arene block and said carboxyl functional groups are carboxylic acids, their salts or esters and (c) about 0.1 to 3 wt.% of the composition of an aminoalkoxysilane.

2. The composition of claim 1 wherein said block copolymer comprises at least about 5 wt.% of the composition.

3. The composition of claim 1 further including glass fibers.

4. The composition of claim 3 wherein said glass fibers comprise from 20 to 65% by weight of the composition.

5. The composition of claim 1 wherein said block copolymer comprises from about 10 to about 30 wt.% of the composition.

6. The composition of claim 1 wherein said hydrogenated block copolymer is a styrene-ethylene/propylene block copolymer or a styrene-ethylene/butylene-styrene block copolymer.

7. The composition of claim 1 wherein said vinyl aromatic block A comprises styrene.

8. The composition of claim 1 wherein said block copolymer comprises about 20 wt.% of said composition.

9. The composition of claim 1 wherein said graftable functional molecule is said electrophile.

10. The composition of claim 1 wherein said graftable functional molecule is said electrophilic graftable molecule.

11. The composition of claim 1 wherein the grafted functional molecule is present at between about 0.02-20 weight percent based on said grafted block copolymer.

12. The composition of claim 1 wherein the grafted functional molecule is present in amounts of between about 0.1-10 weight percent based on the grafted block copolymer.

13. The composition of claim 1 wherein the grafted functional molecule is present in amounts of between about 0.2-5 weight percent based on the grafted block copolymer.

14. The composition of claim 1 wherein said polyarylene sulfide comprises polyphenylene sulfide.

15. The composition of claim 1 wherein said polyarylene sulfide comprises a polyphenylene sulfide homopolymer.

16. The composition of claim 1 wherein said polyarylene sulfide resin comprises a p-phenylene sulfide repeating units and m-phenylene sulfide repeating units.

17. The composition of claim 14 wherein said polyarylene sulfide is formed by reaction of an alkali metal sulfide, one or more dihalobenzenes and a trihalobenzene.

18. An impact resistant polyarylene sulfide composition comprising: (a) polyarylene sulfide, (b) about 10 to about 30 wt.% based on the composition of a functionalized selectively hydrogenated block copolymer of the formula $B_n(AB)_oA_p$ where n=0 or 1, o=1-50, p=0 or 1, each A is predominantly a polymerized monoalkenyl aromatic or vinyl arene hydrocarbon block and each B prior to hydrogenation is predominantly a polymerized conjugated diene hydrocarbon block, to which block copolymer has been grafted at least one graftable functional molecule selected from the group consisting of an electrophilic graftable molecule containing a carboxyl functional group and an electrophile, wherein said electrophile is carbon dioxide, wherein substantially all of said electrophilic graftable molecules or electrophiles are grafted to the block copolymer in the monoalkenyl aromatic or vinyl arene block and said carboxyl functional groups are carboxylic acids, their salts or esters, (c) about 0.1 to 3 wt.% based on the weight of the composition of an aminoalkoxysilane, and (d) about 20 to 65% by weight based on the composition of glass fibers.

19. The composition of claim 18 wherein said hydrogenated block copolymer is a styrene-ethylene/propylene block copolymer or a styrene-ethylene/butylene-styrene block copolymer.

20. The composition of claim 18 wherein said silane is aminopropyltrimethoxysilane or aminopropyltriethoxysilane.

21. The composition of claim 18 wherein said polyarylene sulfide comprises a polyphenylene sulfide homopolymer.

22. The composition of claim 18 wherein said polyarylene sulfide resin comprises a p-phenylene sulfide repeating units and m-phenylene sulfide repeating units.

23. The composition of claim 18 wherein said polyarylene sulfide is formed by reaction of an alkali metal sulfide, one or more dihalobenzenes and a trihalobenzene.

24. The composition of claim 14 wherein said polyphenylene sulfide has been at least partially cured by a heat treatment subsequent to polymerization.

25. An article formed by molding the composition of claim 1.

26. An article formed by molding the composition of claim 18.

* * * * *